US011430122B2

(12) United States Patent
Raiskin et al.

(10) Patent No.: US 11,430,122 B2
(45) Date of Patent: Aug. 30, 2022

(54) HIERARCHICAL SEGMENTATION CLASSIFICATION (71) Applicant: PayPal, Inc., San Jose, CA (US)

(72) Inventors: Yarden Raiskin, Tel Aviv (IL); Yuval Bercovich, Tel Aviv (IL)

(73) Assignee: PAYPAL, INC., San Jose, CA (US)

(*) Notice: Subject to any disclaimer, the term of this patent is extended or adjusted under 35 U.S.C. 154(b) by 252 days.

(21) Appl. No.: 16/711,388

(22) Filed: Dec. 11, 2019

(65) Prior Publication Data
US 2021/0183064 A1 Jun. 17, 2021

(51) Int. Cl.
G06T 7/10 (2017.01)
G06K 9/62 (2022.01)
G06N 20/00 (2019.01)

(52) U.S. Cl.
CPC .............. G06T 7/10 (2017.01); G06K 9/6256 (2013.01); G06K 9/6267 (2013.01); G06N 20/00 (2019.01)

(58) Field of Classification Search
CPC ........ G06N 20/00; G06N 3/0454; G06N 3/08; G06N 7/005; G06N 3/04; G06N 3/0445; G06N 20/10; G06N 3/084; G06N 3/082; G06N 20/20; G06N 5/04; G06N 5/046; G06N 5/022; G06N 3/006; G06N 3/0472; G06N 3/063; G06N 5/003; G06N 5/02; G06N 3/02; G06N 3/0481
USPC ........................................................ 382/173
See application file for complete search history.

(56) References Cited

U.S. PATENT DOCUMENTS 9,262,124 B2* 2/2016 Mello ................... G06Q 50/265
2004/0193573 A1* 9/2004 Meyer .................. G06K 9/6282
2018/0005130 A1* 1/2018 Dong ..................... G06N 20/00
2018/0341627 A1* 11/2018 Moldovean ......... G06F 16/9027
2020/0134682 A1* 4/2020 Sethi ...................... G06T 7/194

* cited by examiner

Primary Examiner — Ajibola A Akinyemi
(74) Attorney, Agent, or Firm — Haynes and Boone, LLP (57) ABSTRACT Systems and methods for hierarchical segmentation and classification may include receiving an input object having a hierarchical data structure. The input object may be segmented at each hierarchical level in a descending manner. The components of each hierarchical level may be classified in an ascending manner. Classification at higher levels may depend on the results from classification at the lower levels. After classification, a hierarchically-classified object may be outputted.

20 Claims, 9 Drawing Sheets

HIERARCHICAL SEGMENTATION CLASSIFICATION

TECHNICAL FIELD

The present disclosure generally relates to data processing and more particularly to hierarchical segmentation classification of objects that have a hierarchical data structure according to various embodiments.

BACKGROUND

Due to the prevalence of the Internet, a large amount of data has been accumulated. Oftentimes, this data may be in the form of objects having a hierarchical data structure. The hierarchical data structure allows for the object to be examined at different levels where each level may reveal a different aspect of the object as a whole. The highest level of the hierarchical data structure may correspond to a lowest granularity. As the levels progress downward from the highest level, there may be an increase in granularity until a lowest level of the hierarchical data structure corresponding to a highest granularity is reached. Classification of such objects is technically inefficient and subject to large computational error because conventional machine learning architectures consider the available data of the object while not utilizing the hierarchical data structure of the object. There exists a need to improve upon prior classification systems and methods by utilizing the hierarchical nature of objects.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure describes systems and methods for classifying objects having a hierarchical data structure according to various embodiments. The hierarchical data structure of an object may allow the object to be evaluated at different hierarchical levels where each individual level reveals aspects of the object as a whole. Conventional machine learning architecture may begin classifying at the highest level of the hierarchical data structure and attempt to classify the highest level without understanding, recognizing, or utilizing classifications at lower levels. Thus, conventional machine learning architecture attempts to initially solve a highly complex problem (classifying an entire object) by beginning at the highest levels of the hierarchical data structure with limited or no knowledge about the lower levels in the hierarchical data structure.

The present disclosure provides an improved system and method for classifying objects having a hierarchical data structure by classifying data components at the lowest levels of the hierarchical data structure and ascending upward to the higher levels to classify components of the higher levels using consolidated classifications from the lower levels. In this regard, embodiments of the present disclosure solve the lowest complexity problems first, then solve increasingly more complex problems by using knowledge attained from the lower complexity problems. By solving less complex problems at the lower levels and moving from the lower levels to the higher levels to solve more complex problems, computational performance is improved. That is, by classifying in a manner beginning from a lower level and moving to a higher level, classifications at the higher level are more likely to be correct as the classifications at the higher levels are performed with results (e.g., knowledge, awareness) of classifications at the lower levels. Additional computer processing improvements will be apparent to one skilled in the art in view of the description of the embodiments presented herein.

In some embodiments, a hierarchical segmentation and classification system receives an object that has a hierarchical data structure. The hierarchical data structure may have a plurality of levels spatially structured in a hierarchical manner such that the system may decipher the relationships between various components of the object. In this regard, the hierarchical data structure provides a spatial context of the various components contained therein. In various embodiments, the system segments the object into its constituent parts at each of the plurality of hierarchical levels. Each level of the object may be segmented beginning from the highest level and moving downward toward the lowest level. Once the object has been segmented, a classification process may begin at the lowest level. Each component of the lowest level may be classified based on raw data of the component. After each component of the lowest level has been classified, each classified component of the lowest level may be reassembled according to their respective segmented portions and provided to respective components of the second lowest level (e.g., one level above the lowest level) for classification performed at the second lowest level.

In the second lowest level, the components may be classified based on raw data of each component and/or the results from the classified components at the lowest level. After each component of the second lowest level has been classified, each classified component of the second level may be reassembled according to their respective segmented portions and provided to respective components of the third lowest level (e.g., one level above the second lowest level) for classification performed at the third lowest level. The above process may iteratively continue in the ascending manner until each level in the hierarchical data structure has been classified.

Figure 1:
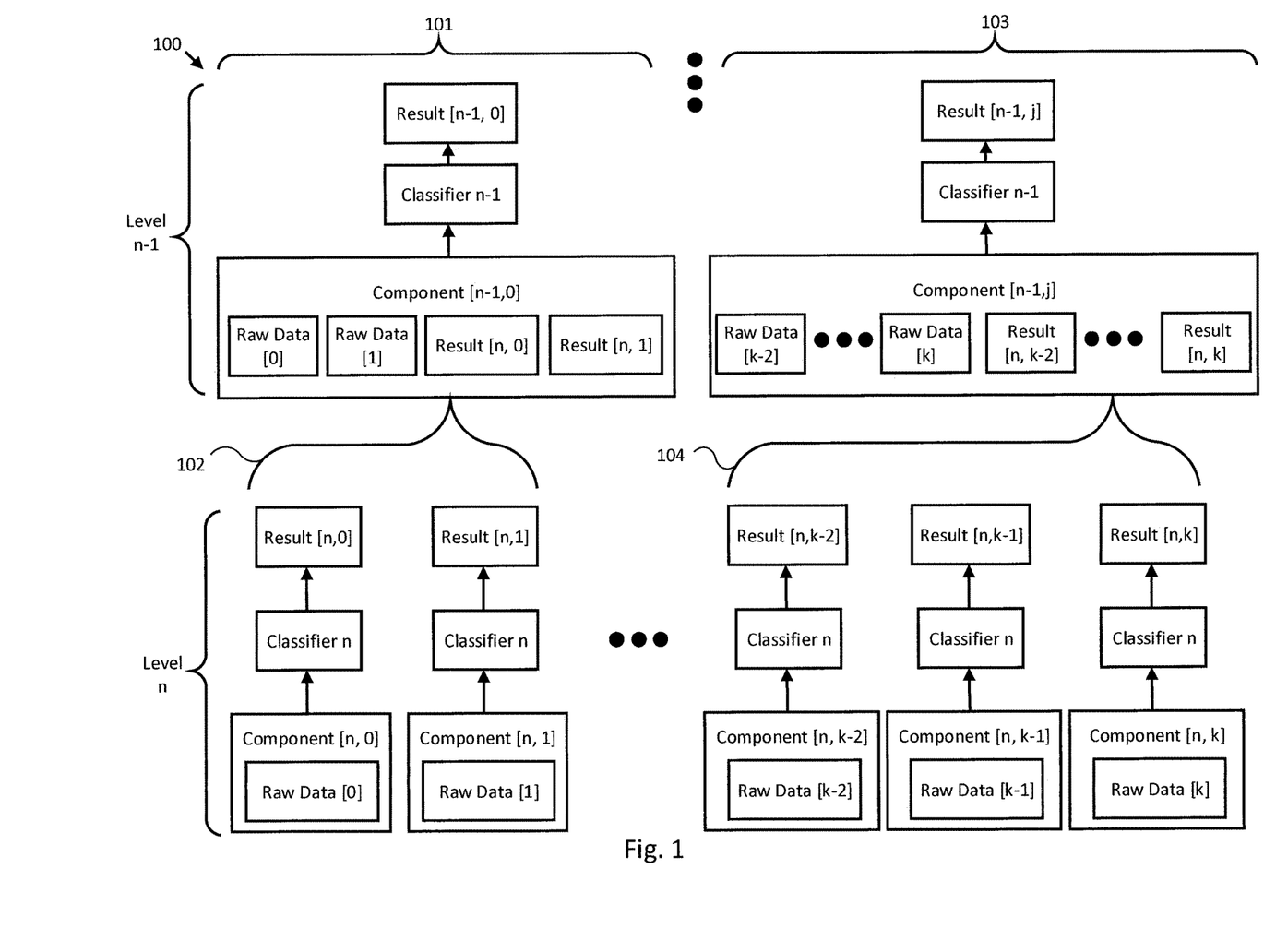
FIG. 1 illustrates a process for hierarchical segmentation and classification in accordance with one or more embodiments of the present disclosure.
Figure 2A:
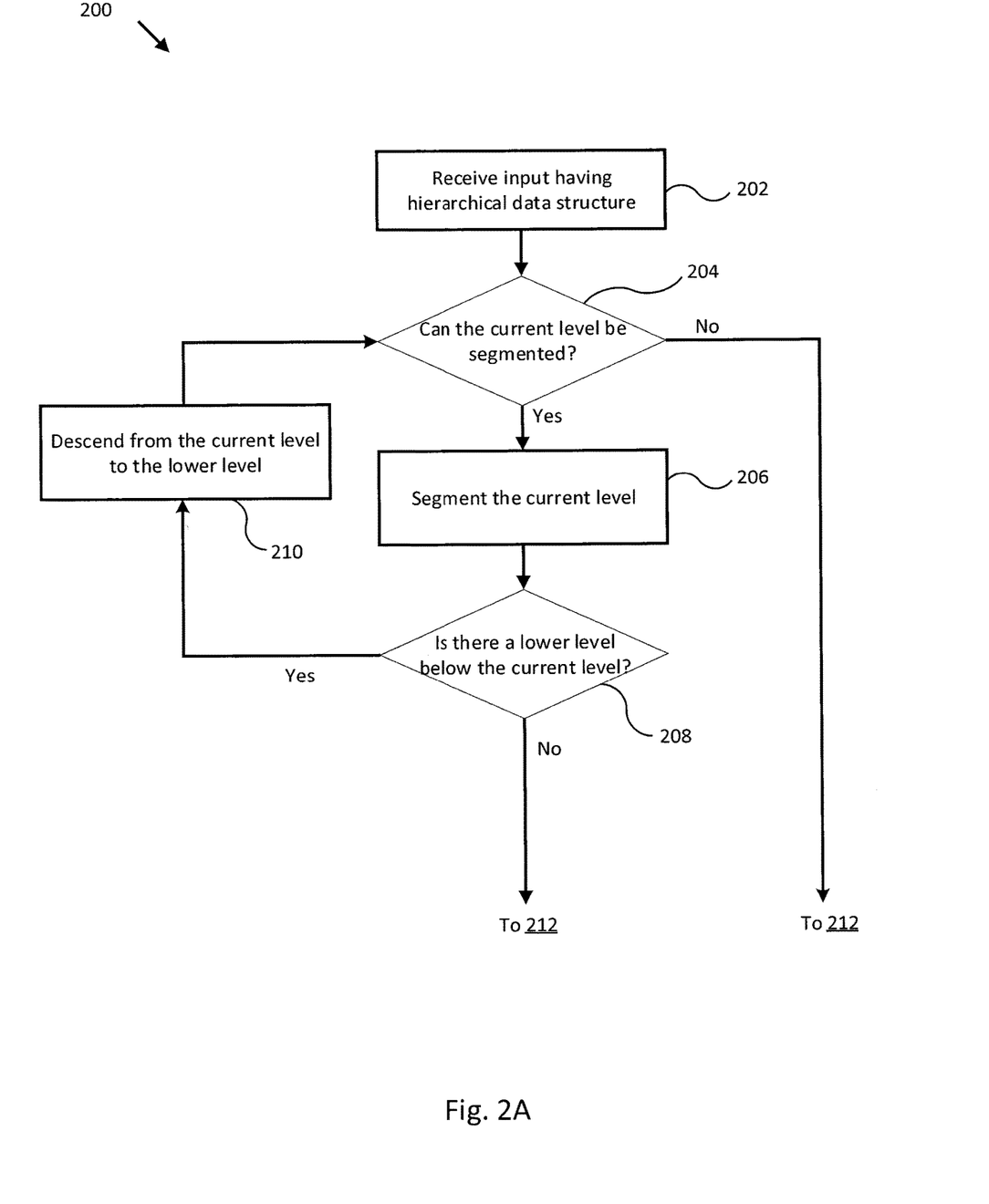
FIGS. 2A and 2B illustrate a flow diagram of a process for hierarchical segmentation and classification in accordance with one or more embodiments of the present disclosure.
Figure 2B:
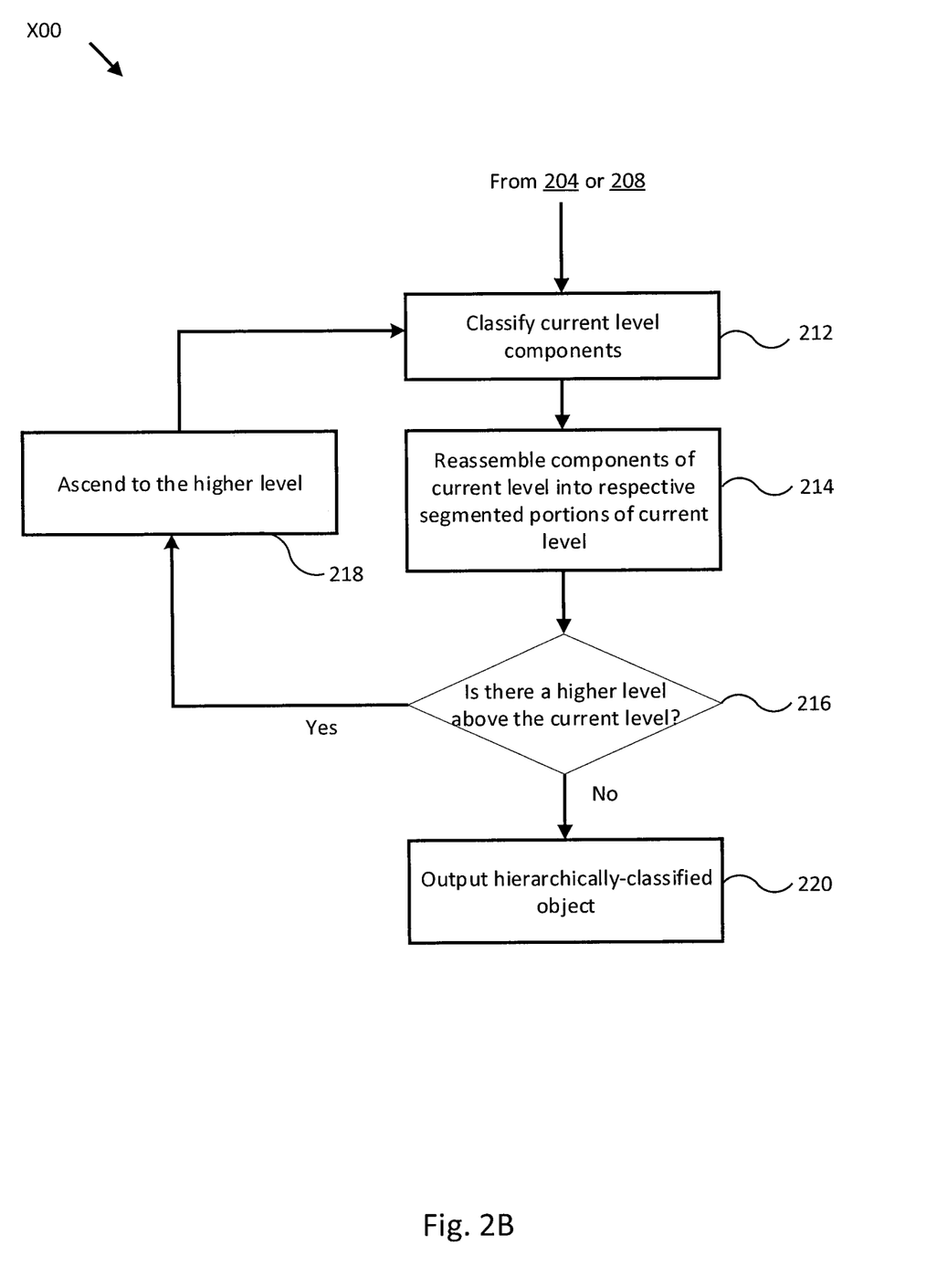

The present disclosure now refers to FIGS. 1, 2A, and 2B. FIG. 1 illustrates a block diagram of an object 100 having a hierarchical data structure in accordance with one or more embodiments of the present disclosure. Not all of the depicted features may be required, however, and one or more embodiments may include additional features not shown in the figure. Variations in the arrangement and type of the features may be made without departing from the spirit or scope of the claims as set forth herein. Additional features, different features, and/or fewer features may be provided. FIGS. 2A and 2B illustrate a flow diagram of a process 200 for hierarchical segmentation and classification in accordance with one or more embodiments of the present disclosure. For explanatory purposes, process 200 is primarily described herein with reference to FIG. 1; however, process 200 is not limited to FIG. 1. The blocks of process 200 are described herein as occurring in serial, or linearly (e.g., one after another). However, multiple blocks of process 200 may occur in parallel. In addition, the blocks of process 200 need not be performed in the order shown and/or one or more of the blocks of process 200 need not be performed.

At block 202, a hierarchical segmentation and classification system receives an input having a hierarchical data structure. The input may be object 100 of FIG. 1. Object 100 may have a hierarchical data structure including a plurality of different hierarchical levels with defined spatial relationships between components of the hierarchical levels. The defined spatial relationships may include a nesting of the components of object 100 that may indicate the different levels. The spatial relationship may also include separation and distances between components on each level. In some cases, the spatial relationships between components of higher levels and components of lower levels may be used in reassembling or consolidation operations according to various embodiments presented herein.

Object 100 includes a lowest level (depicted as "Level n") and a next level above the lowest level (depicted as "Level n−1"). As indicated by the ellipsis, object 100 may include several hierarchical levels beyond the levels depicted in FIG. 1 (e.g., Level n−2, Level n−3, Level n−4, etc.). In this regard, the plurality of hierarchical levels may include a lowest level, one or more intermediate levels, and a highest level. In some cases, the plurality of hierarchical levels may include a lowest level and a highest level without intermediate levels.

According to various embodiments, each level of object 100 may include one or more components. As shown in FIG. 1, object 100 includes component [n, 0] through component [n, k] at Level n. Object 100 includes component [n−1, 0] through component [n−1, j] at Level n−1. Object 100 is not limited to the levels and components depicted in FIG. 1 and may include additional levels having one or more components without departing from the scope of the various embodiments described in the present disclosure.

At block 204, beginning at a highest level of object 100, the hierarchical segmentation and classification system determines whether the current level can be segmented. In some cases, object 100 may be a markup file or document. For example, object 100 may be a Hypertext Markup Language (HTML), Extensible Markup Language (XML), Extensible Hypertext Markup Language (XHTML), Astronomical Markup Language (AML), Keyhole Markup Language (KML), Vector markup Language (VML) file or document. Object 100 may have a predefined structure that facilities determining whether the current level can be segmented. For example, an HTML input may include HTML elements, tags or other HTML features that can be used to determine whether the current level can be segmented. Other markup language inputs may have other indicators that allow the hierarchical segmentation and classification to determine whether a current level can be segmented. Additional file formats supporting segmentation other than those above may be provided as an input.

If the current level can be segmented, process 200 proceeds to block 206 where the current level is segmented. The current level may be segmented according to segmentation boundaries of the current level. For example, the current level of object 100 may be segmented based on positions of HTML elements, attributes, headings, paragraphs, styles, formatting, quotations, comments, colors, links, images, tables, lists, blocks, classes, layouts and/or tags. In various embodiments, HTML elements may include header (h1, h2, h3, h4, h6, etc.), title, paragraph, body, etc. In some embodiments, HTML attributes may include source, width and height, alternative text, style, language, and/or title. In one or more embodiments, HTML text formatting may include bold, italic, superscript, subscript, emphasized text, marked text, small text, deleted text, inserted text, important (e.g., strong) text, etc. One or more HTML features may be used to determine boundaries for segmentation in according to one or more embodiments. Various other HTML features may be suitable for determining boundaries to segment the current level in a desired application.

As shown in FIG. 1, component [n−1,0] through component [n−1, j] of Level n−1 may be segmented into segments 101 and 103 respectively. Each segment (sub-part, sub-element, etc.) may be a constituent part of the current level. After Level n−1 has been segmented, process 200 proceeds to block 208 where a determination is made as to whether there is a lower level below the current level. In this case, an affirmative determination is made that Level n exists below Level n−1. Thus, process 200 proceeds to block 210 where the system descends from the current level (Level n−1) to the lower level (Level n).

After descending from Level n−1 to Level n, process 200 returns to block 204. At block 204, a determination is made as to whether the current level (now Level n) can be segmented. As illustrated in FIG. 1, an affirmative determination can be made that Level n can be segmented. Thus, process 200 proceeds to block 206 where the current level, Level n, is segmented. Component [n, 0] and component [n, 1] are segmented into segment 102. Component [n, k−2], component [n, k−1], and component [n, k] are segmented into segment 104. After Level n has been segmented, process 200 proceeds to block 208 where the system determines whether there is a lower level below the current level, Level n. Since Level n is the lowest level of object 100, in this case, there is not a lower level below the current level, Level n. Thus, process 200 proceeds to block 212.

At block 212, the components of the current level are classified. The first current level may be the lowest level of object 100. In various embodiments, process 200 includes navigating directly to the lowest level of object 100 based on the hierarchical data structure of object 100 to begin the hierarchical classification process. Each component of the lowest level may be classified based on raw data corresponding to the component. As shown in FIG. 1, component [n, 0] includes raw data [0]; component [n, 1] includes raw data [1]; component [n, k−2] includes raw data [k−2]; component [n, k−1] includes raw data [k−1]; component [n, k] includes raw data [k]. Raw data may be or may include text features, letters, markup tags and/or elements, visual styles, word patterns, symbols, numbers, formatting, or other features that may be used to classify the component. In some cases, the HTML features (e.g., one or more or a combination thereof) discussed above may be used as raw data.

As an illustrative example, the raw data [0] may include a United States dollar symbol (e.g., "$") and numbers (e.g., "95.00"), which may be used in classifying component [n, 0] as a price. The result of classifying component [n, 0] as a price may be stored as result [n, 0] (e.g., in a database, memory, etc.). As another illustrative example, raw data [1] may include an HTML select attribute and text of "Lens Color," which may be used in classifying component [n, 1] as a color selection. The result of classifying component [n, 1] as a color selection may be stored as result [n, 1]. Classification of component [n, k−2] through component [n, k] using raw data [k−2] through raw data [k] to provide respective results [n, k−2] through [n, k] may be performed in a similar manner.

In various embodiments, a respective classifier of a plurality of classifiers is used to classify components in the current level. For example, Level n of object 100 may be classified using classifier n. Level n−1 of object 100 may be classified using classifier n−1. In one or more embodiments, the classifiers used at each level may be different. In some embodiments, two or more of the classifiers used in different levels may be the same. The classifiers may be or may include various machine learning classification algorithms such as linear classifiers (e.g., logistic regression, Naive Bayes Classifier), Nearest Neighbor, Support Vector Machines, Decision Trees, Boosted Trees, Random Forest, Neural Networks, etc.

At block 214, the classified components of the current level are reassembled (e.g., consolidated) into respective segments of the current level. In various embodiments, the components are reassembled according to the spatial relationships defined in the hierarchical data structure of object 100. For example, the components nested within other components may have a spatial relation that can be used to determine how to reassemble the results of the lower level classification to segments corresponding to components of a higher level. As shown in FIG. 1, the components of Level n are classified using classifier n to provide respective results. Results [n, 0] and [n, 1] which represent classified components [n, 0] and [n, 1] respectively, may be reassembled/consolidated to segment 102. Segment 102 may correspond to component [n−1, 0] of Level n−1. Likewise, results [n, k−2], [n, k−1], and [n, k] which represent classified components [n, k−2], [n, k−1], and [n, k] respectively may be reassembled/consolidated to segment 104. Segment 104 may correspond to component [n−1, j] of Level n−1. In various embodiments, the results are not reassembled/consolidated into components of higher levels but are made available for use during classification of said components of higher levels.

At block 216, after classification and reassembly/consolidation at the current level, the system determines whether there is a higher level above the current level (e.g., a next level above the current level). If there is a higher level above the current level, the system ascends to the higher level at block 218. The system may ascend (e.g., navigate, move, transition, maneuver, step, shift, etc.) to the higher level using the recognized hierarchical data structure.

After block 218, process 200 returns to block 212 to classify the current level components using a classifier corresponding to the current level. To illustrate, the system may ascend from Level n to Level n−1 of object 100. Components [n−1, 0] through [n−1, j] of Level n−1 may be classified using classifier n−1 based on respective raw data and the results from lower levels.

As an illustrative example, component [n−1, 0] may include raw data [0], raw data [1], result [n, 0] and result [n, 1] where raw data [0] may be a visual style feature of component [n−1, 0], raw data [1], may be a formatting feature of component [n−1, 0], result [n, 0] may be a classification of component [n, 0] as price, and result [n, 1] may be a classification of component [n, 1] as color selection. Classifier n−1 may use raw data [0], raw data [1], result [n, 0] and result [n, 1] of component [n−1, 0] to classify component [n−1, 0] as an item description. The result of classifying component [n−1, 0] may be provided as result [n−1, 0]. Result [n−1, 0] may be reassembled into segment 101 and provided to Level n−2 for further classification of a component at Level n−2. Note that Level n−2 and one or more components thereof are not depicted in FIG. 1. Classifier n−1 may classify component [n−1, j] in a similar manner to the classification of component [n−1,0]. Similarly, component [n−1, j] may be reassembled into segment 103 and provided to Level n−2 for further classification of a component at Level n−2.

The iterative process described above may continue until a highest level is reached and classified. After classification of one or more components at the highest level, the system determines at block 216 that there is not a higher level above the current level as the highest level is now the current level, and proceeds to block 220.

At block 220, the system outputs the hierarchically-classified object. At the end of process 200, object 100 has been completely classified from the lowest level and ascending to the highest level of the hierarchical levels, including any intermediary levels. Classifying each component of each level of a data object allows a user to easily query, rank, summarize, and efficiently browse the classified data object. Thus, other data processing techniques such as information extraction can be performed on the classified data object in an efficient and accurate manner. Therefore, one of skill in the art will appreciate the technical advantages and improvements to a computer through implementation of the hierarchical segmentation and classification systems and methods described herein.

Figure 3A:
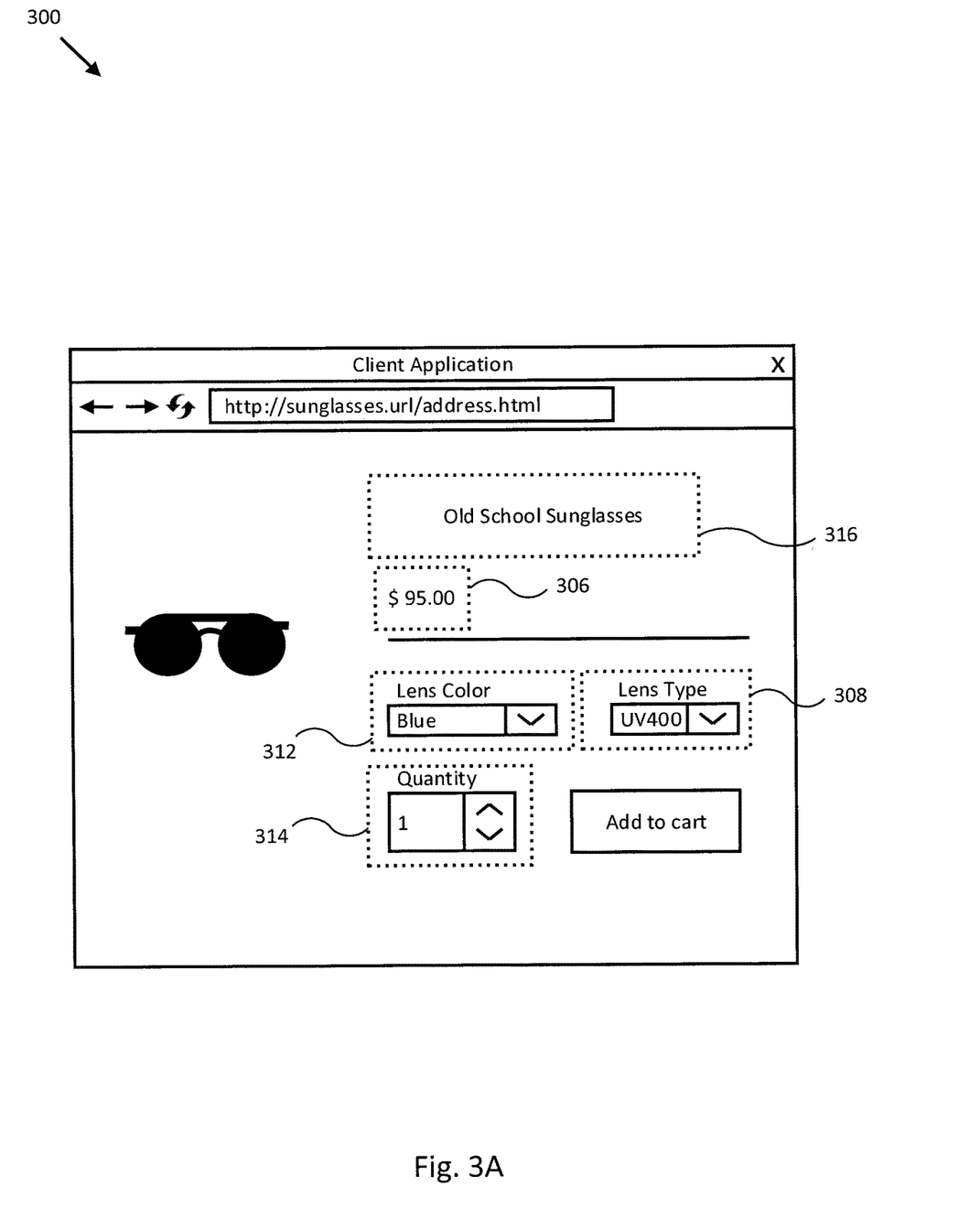
FIGS. 3A-3C illustrate hierarchical segmentation and classification of a webpage in accordance with one or more embodiments of the present disclosure.
Figure 3B:
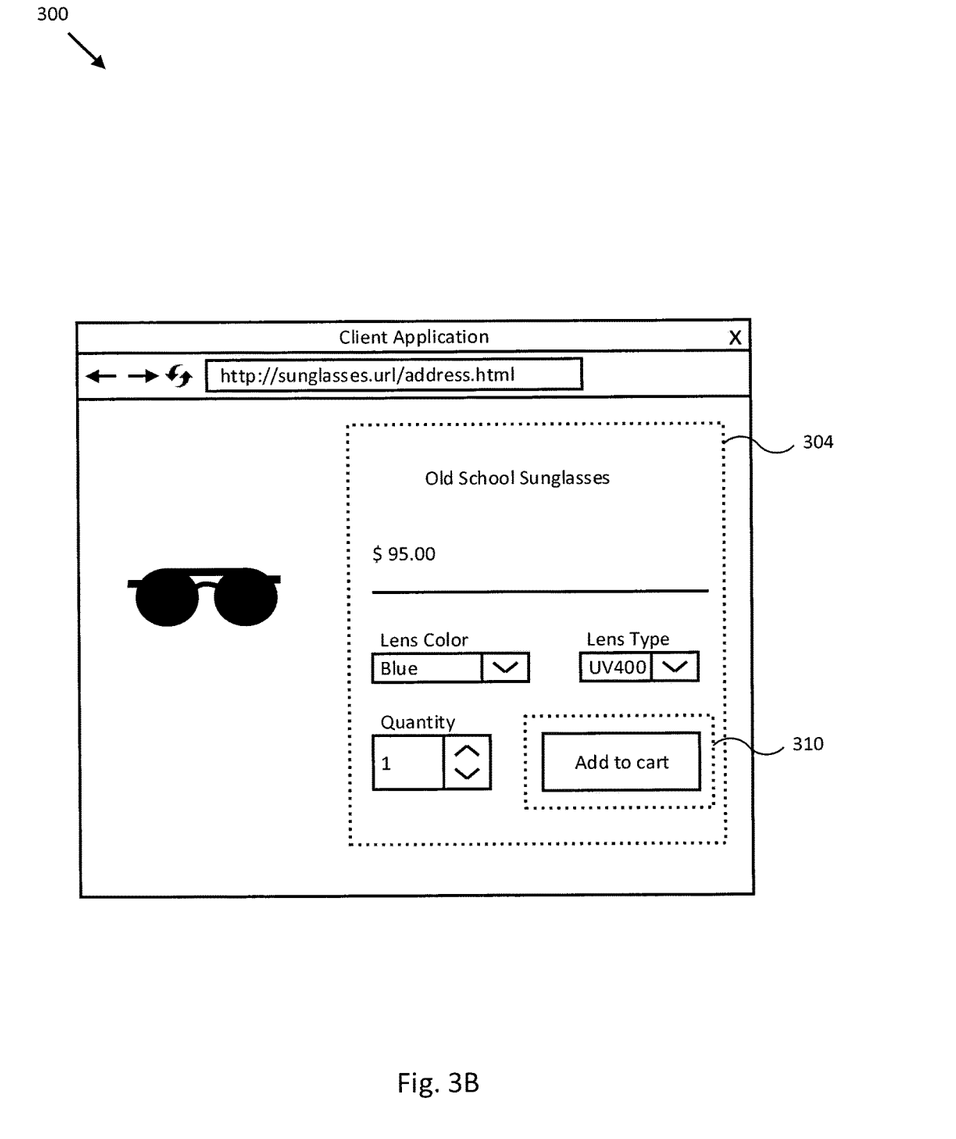
Figure 3C:
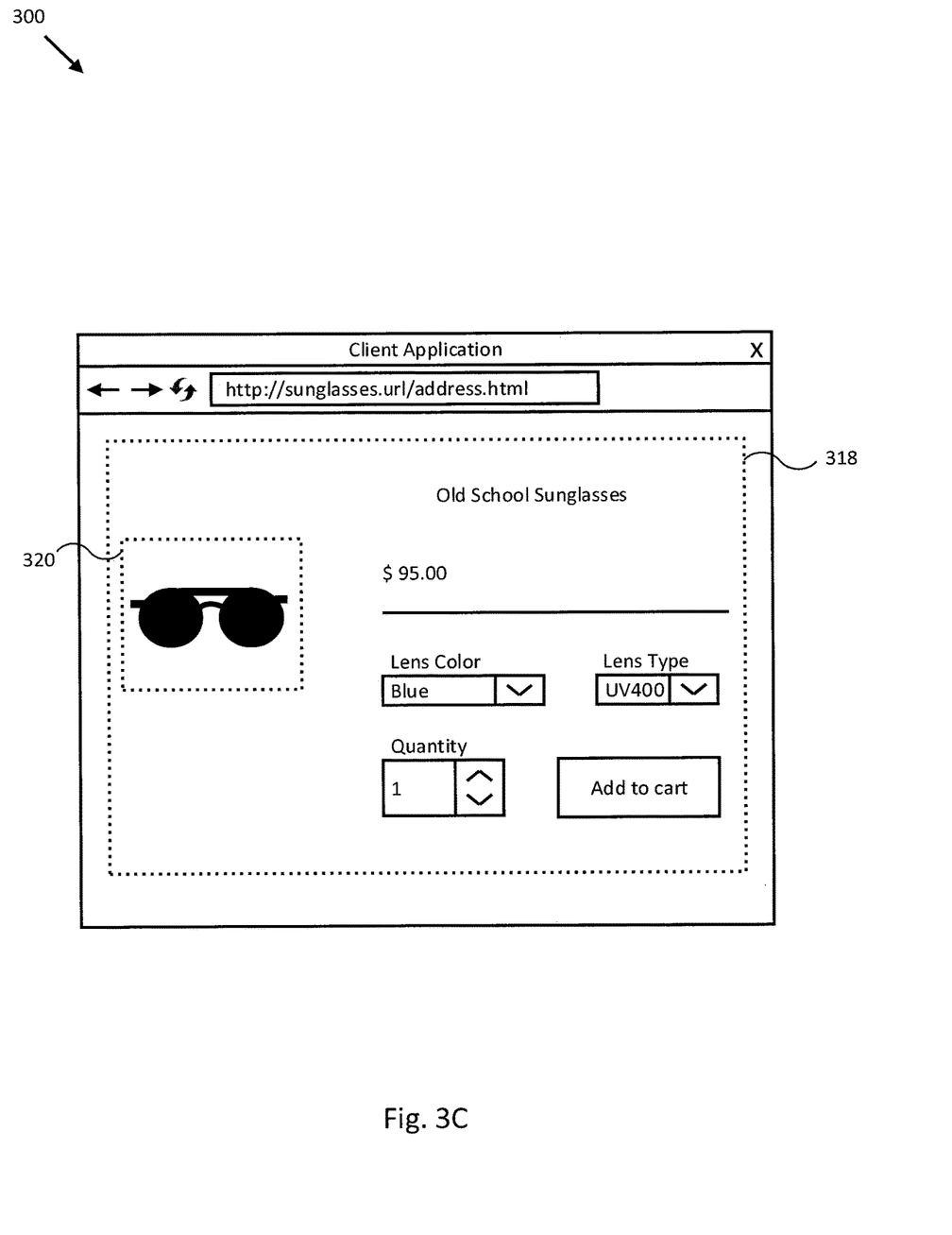

FIGS. 3A, 3B, and 3C illustrate hierarchical segmentation and classification of a webpage 300 in accordance with one or more embodiments of the present disclosure. In some embodiments, webpage 300 may be segmented at each level beginning from a highest level and descending to a lowest level. After each level has been segmented, webpage 300 may be classified. Webpage 300 may be classified by first navigating to the lowest level of webpage 300 and classifying each of the components of the lowest level. The lowest level of webpage 300 includes components 316, 306, 308, 310, 312, and 314. Component 316 may be classified as "title." Component 306 may be classified as "price." Components 308 and 312 may be classified as "select attribute." Component 314 may be classified as "select number." Component 310 may be classified as "add to cart button."

As shown in FIG. 3B, once each component of the lowest level has been classified, the system may maneuver from the lowest level to an intermediate level. The intermediate level includes component 304. Component 304 may include the results of the classifications of components performed at the lowest level and raw data 310. The system may classify component 304 of the intermediate level based on the results of the classifications of components at the lowest level and raw data 310. For example. component 304 may be classified as "select product."

As shown in FIG. 3C, once each component of the intermediate level has been classified, the system may maneuver from the intermediate level to a highest level. The highest level includes component 318. Component 318 may include the results of the classifications of components performed at the intermediate level and raw data 320. The system may classify component 318 of the intermediate level based on the results of the classifications of components at the intermediate level and raw data 320. For example, component 318 may be classified as "item description."

After each level of webpage 300 has been classified, the system may provide an output in a format suitable for examining the hierarchically classified webpage. Hierarchical segmentation and classification of a webpage allows for improved web intelligence tasks, including KYB or Know Your Business, guided crawling and scraping critical data such as shipping policies, return policies, product catalogs, prices, etc.

The illustrations of FIGS. 3A-3C provide examples used to demonstrate one or more concepts associated with the present disclosure. The examples of FIGS. 3A-3C are not intended to limit the scope of the embodiments of the present disclosure.

Figure 4:
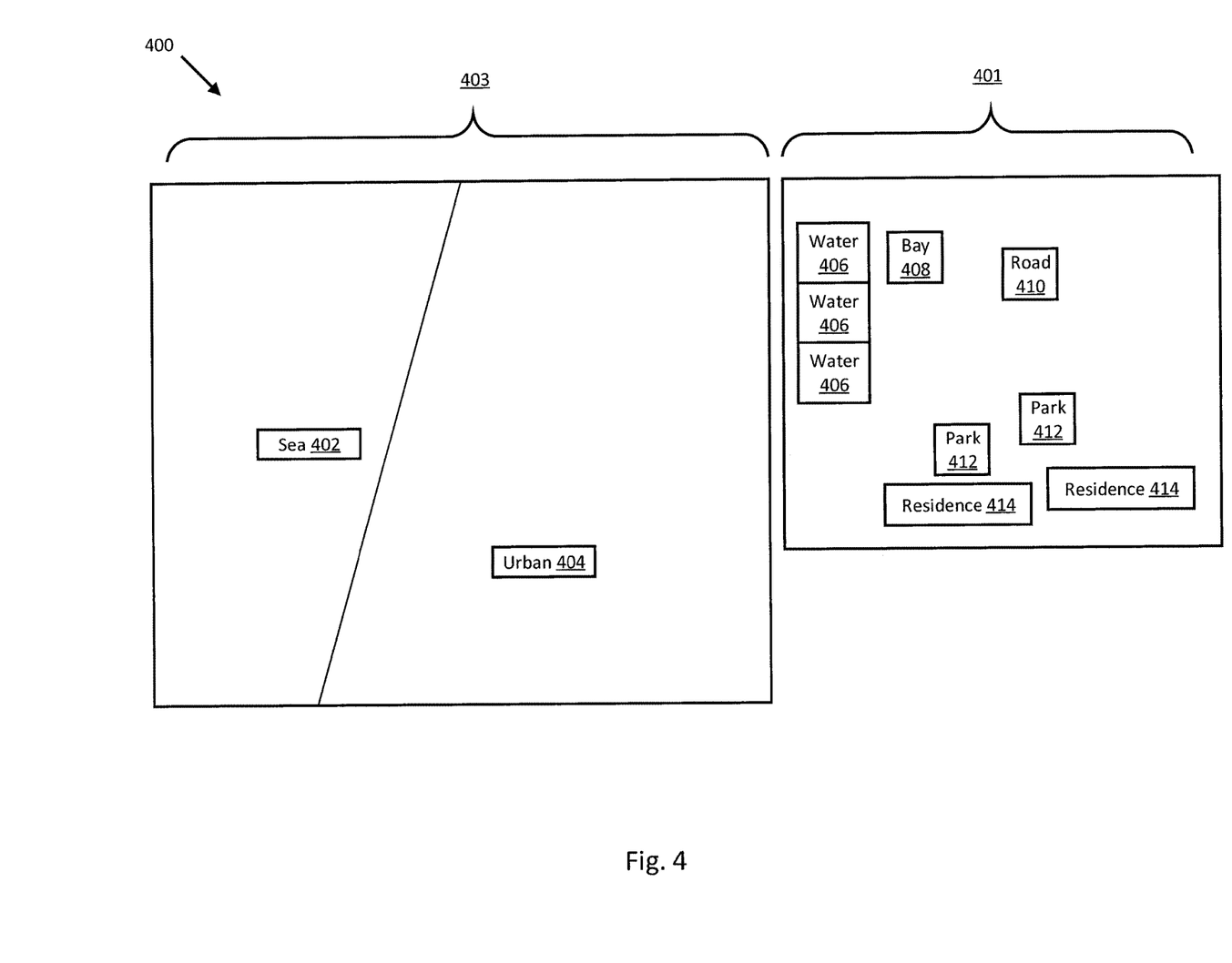
FIG. 4 illustrates hierarchical segmentation and classification of satellite imagery in accordance with one or more embodiments of the present disclosure.

FIG. 4 illustrates an example hierarchical segmentation and classification of satellite imagery 400 in accordance with one or more embodiments of the present disclosure. For example, satellite imagery may be a KML or Keyhole Markup Language file. In some embodiments, satellite imagery 400 may be segmented at each level beginning from a highest level and descending to a lowest level 401. After each level has been segmented, satellite imagery 400 may be classified. Satellite imagery 400 may be classified by first navigating to lowest level 401 of satellite imagery 400 and classifying each of the components of lowest level 401. After classification, lowest level 401 of satellite imagery 400 includes classified components: water 406, bay 408, road 410, park 412, and residence 414.

Once each component of lowest level 401 has been classified, the system may navigate from lowest level 401 to a higher level 403. Classification may be performed at higher level 403. Classification at higher level 403 may use the results of classification at lowest level 401. Thus, higher level may be classified to have classified components: sea 402 and urban 404. Sea 402 may be classified based on raw data and/or results of classification at lowest level 401: water 406 and bay 408. Urban 404 may be classified based on raw data and/or results of classification at lowest level 401: road 410, park 412, and residence 414.

Figure 5:
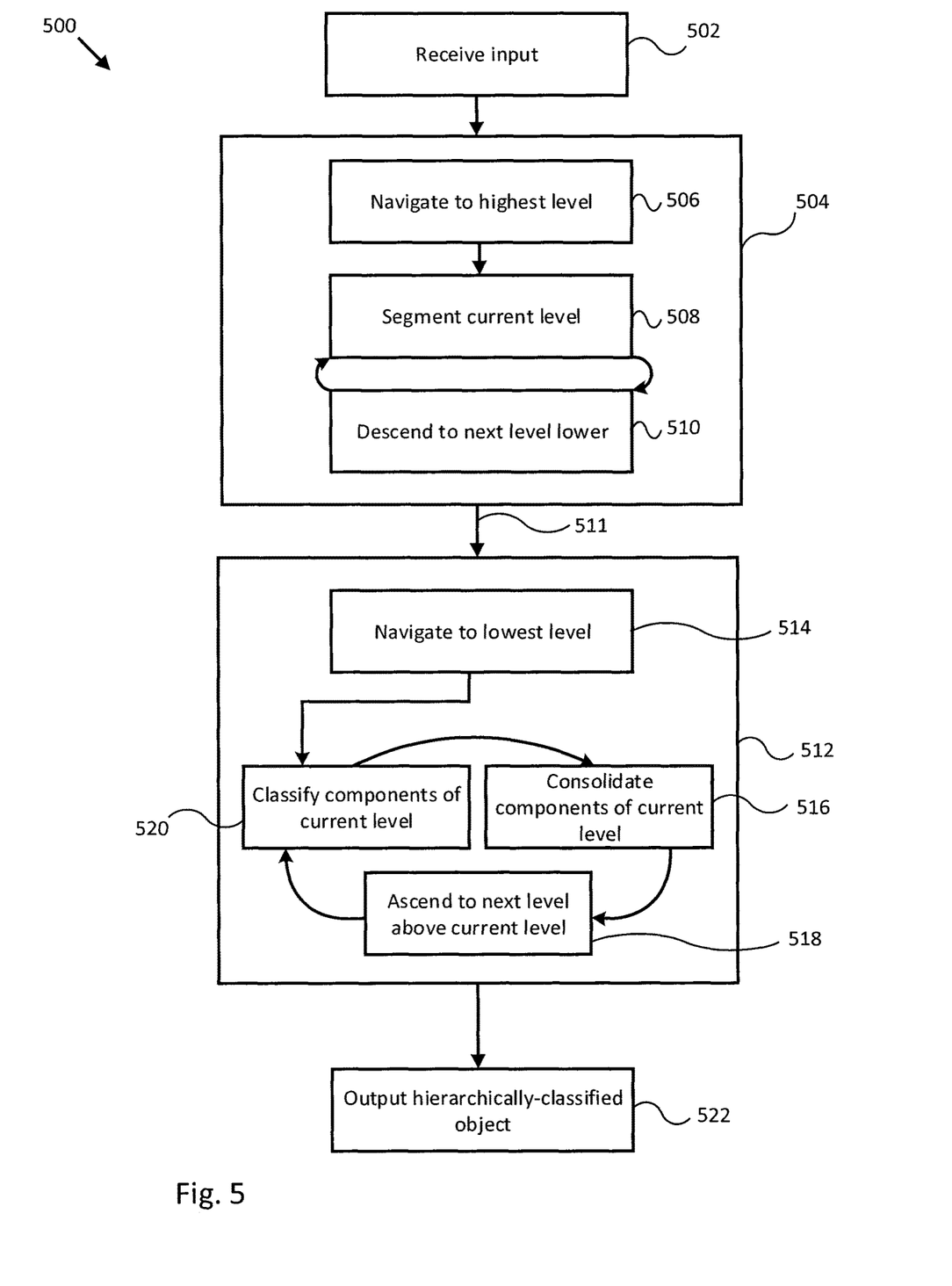
FIG. 5 illustrates a flow diagram of a process for hierarchical segmentation classification in accordance with one or more embodiments of the present disclosure.

FIG. 5 illustrates a flow diagram of a process 500 for hierarchical segmentation classification. The operations of process 500 are described herein as occurring in serial, or linearly (e.g., one after another). However, multiple operations of process 500 may occur in parallel. In addition, the operations of process 500 need not be performed in the order shown and/or one or more of the operations of process 500 need not be performed.

At operation 502, an input is received according to various embodiments. The input may be retrieved from a database in some implementations. The input may be obtained from data scraping a website (e.g., parsing a webpage and gathering information) in some cases. The input may be received as part of an Application Programming Interface (API) call in one or more cases. According to some embodiments, the input may have a file format that is determined to have a hierarchical data structure. For example, nested elements of the input may be recognized as forming a hierarchical data structure.

The input is fed to segmentation system 504. At operation 506, segmentation system 504 navigates to a highest level of the input according to the hierarchical data structure. At operation 508, beginning from the highest level, segmentation is performed. Once the highest level has been segmented, segmentation system 504 descends to the next level below the highest level at operation 510. Segmentation system 504 returns to operation 508 after descending to the lower level and segmentation at the lower level is now performed. The descending iteration between operations 508 and 510 may continue to be performed for each hierarchical level of the input. Segmentation may conclude at the lowest level of the hierarchical levels.

After segmentation by segmentation system 504 has concluded, segmentation system 504 provides segmented input 511 to classification system 512. Classification system 512 proceeds to operation 514 to navigate to a lowest level of the input according to the hierarchical data structure. At operation 521, beginning from the lowest level, classification of components of the current level is performed. Once the components of the lowest level have been classified, classification system consolidates the components of the current level to their respective segmented portions in operation 516. Following the consolidation of classified components, classification system 512 ascends to the next level higher at operation 518. Classification system 512 returns to operation 520 after ascending to the higher level and classification of components at the higher level is performed using the classification results determined at the lowest level. The ascending iteration between operations 520, 516, and 518 is performed for each hierarchical level of the input. Classification may conclude at the highest level of the hierarchical levels.

After classification by classification system 512 has concluded, process 200 proceeds to operation 522. At operation 522, a hierarchically-classified object is outputted.

In an example use case, Internet Protocol (IP) addresses may be hierarchically segmented and classified. For example, a range of IP addresses may be segmented down to a single IP address and further into ports. As such, an internet service provider may be able to classify a data object comprising IP addresses down to granular levels to enable the internet service provider to easily classify the IP address ranges.

Figure 6:
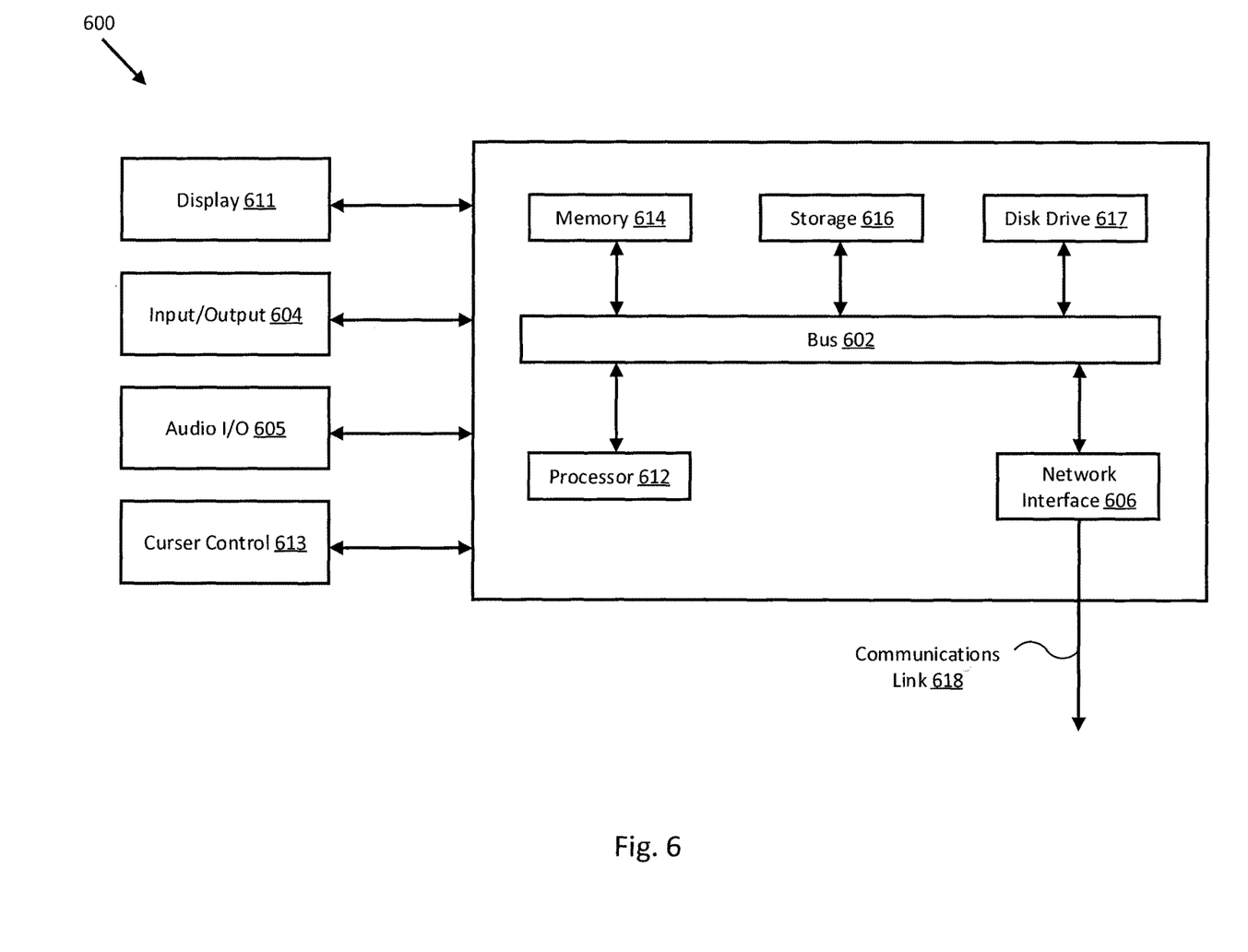
FIG. 6 illustrates a block diagram of a computer system in accordance with one or more embodiments of the present disclosure.

FIG. 6 illustrates a block diagram of a computer system 600 suitable for implementing one or more embodiments of the present disclosure. In various implementations, a user device may comprise a personal computing device (e.g., a personal computer, laptop, smart phone, PDA, Bluetooth device, tablet, mobile device, etc.) capable of communicating with the network. It should be appreciated that each of the devices utilized by users, entities, service providers, and networks discussed herein may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 613 (such as a keyboard, keypad, mouse, etc.). I/O component 604 may further include NFC communication capabilities, such as an NFC reader to allow NFC communication with other devices and/or physical cards as discussed herein. An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device, an entity server, and/or a provider server via network 114. In one embodiment, the transmission is wireless, although other transmission mediums and methods may also be suitable. Processor 612, which may be one or more hardware processors, can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer-readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to a network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system, comprising:
 a non-transitory memory; and
 one or more hardware processors coupled to the non-transitory memory and configured to read instructions from the non-transitory memory to cause the system to perform operations comprising:
  receiving a data object comprising a hierarchical data structure having a plurality of hierarchical levels;
  segmenting each level of the plurality of hierarchical levels, beginning from a highest level and moving to a lowest level, into one or more segmented portions;
  classifying one or more components in each level of the plurality of hierarchical levels, beginning from the lowest level and moving upward to the highest level, wherein the classifying is based, for each level other than the lowest level, at least in part on one or more classified components respectively reassembled into the one or more segmented portions from a lower level; and
  outputting a hierarchically-classified object associated with the data object based at least in part on the classifying.

2. The system of claim 1, wherein the classifying the one or more components of the current level is performed using a respective classifier for each level.

3. The system of claim 1, wherein the data object comprises a Hypertext Markup Language (HTML) file.

4. The system of claim 3, wherein the operations further comprise extracting text data from the HTML file, the text data having the hierarchical data structure.

5. The system of claim 3, wherein the segmenting each level of the plurality of hierarchical levels is based at least in part on HTML elements and HTML tags.

6. The system of claim 1, wherein the classifying the one or more components of the current level is based at least in part on raw data.

7. The system of claim 6, wherein the raw data comprises inline text semantics.

8. The system of claim 1, wherein the operations further comprise data scraping a website to receive the data object.

9. The system of claim 1, wherein the classifying the one or more components in each level is performed using an eXtreme Gradient Boosting (XGBoost) machine learning model.

10. The system of claim 1, wherein the classifying the one or more components is performed using a random forest machine learning model.

11. A method comprising:
receiving an input comprising a data object comprising a hierarchical data structure having a plurality of hierarchical levels;
while a current level of the plurality of hierarchical levels can be further segmented, repeating first operations comprising:
segmenting the current level of the data object into a plurality of segmented portions of the current level; and
descending from the current level to a lower level of the data object unless the current level is a lowest level in the plurality of hierarchical levels;
for each level beginning from the lowest level and ascending to a highest level in the plurality of hierarchical levels, executing second operations comprising:
classifying one or more components of the current level, wherein for each level, other than the lowest level, the classifying is based at least in part on one or more classified components consolidated into segmented portions from the lower level; and
consolidating the classified one or more components of the current level into respective segmented portions of the current level; and
outputting a hierarchically-classified object associated with the data object.

12. The method of claim 11, wherein a respective classifier for each level of the plurality of hierarchical levels is used to perform the classifying and the consolidating.

13. The method of claim 12, wherein the segmenting the current level of the data object into the plurality of segmented portions of the current level is based on a spatial context from the hierarchical data structure.

14. The method of claim 11, wherein the input is a markup language file.

15. The method of claim 14, wherein the markup language file is a Keyhole Markup Language (KML) file.

16. A non-transitory machine-readable medium having stored thereon machine-readable instructions executable to cause a machine to perform first operations comprising:
receiving a data object comprising a hierarchical data structure having a plurality of hierarchical levels;
segmenting the hierarchical levels into segmented portions;
repeating, for each level beginning from the lowest level and ascending to and including a highest level of the hierarchical levels, second operations comprising:
classifying each component of a current level;
consolidating the classified components into respective segmented portions of the segmented portions; and
ascending to a level above the current level unless the current level is the highest level; and
outputting a hierarchically-classified object associated with the data object.

17. The non-transitory machine-readable medium of claim 16, wherein the operations further comprise navigating directly to the lowest level of the hierarchical levels based on the hierarchical data structure.

18. The non-transitory machine-readable medium of claim 16, wherein the classifying each component of the lowest level is based on features of the component, and wherein the classifying each component of each level above the lowest level is based on features of the component and one or more classified components consolidated into the segmented portions from lower levels.

19. The non-transitory machine-readable medium of claim 16, wherein the segmenting comprises parsing a Hypertext Markup Language (HTML) file.

20. The non-transitory machine-readable medium of claim 16, wherein a plurality of classifiers, each associated with a respective level of the hierarchical levels, are used in the classifying.

* * * * *